United States Patent [19]
Lallo et al.

[11] Patent Number: 5,248,242
[45] Date of Patent: Sep. 28, 1993

[54] AERODYNAMIC ROTOR BLADE OF COMPOSITE MATERIAL FABRICATED IN ONE CURE CYCLE

[75] Inventors: Art J. Lallo, Glenolden, Pa.; Peter G. C. Dixon, Poquosom, Va.

[73] Assignee: The Boeing Company, Seattle, Wash.

[21] Appl. No.: 589,652

[22] Filed: Sep. 28, 1990

[51] Int. Cl.⁵ .................... B64C 27/46; B23P 15/04
[52] U.S. Cl. ........................... 416/226; 29/889.61;
156/156; 156/245; 156/285; 264/258; 264/314;
416/230
[58] Field of Search ............... 156/245, 156, 242, 285;
416/226, 230; 29/156.8 P, 889.6, 889.61,
889.71, 889.72, 889.721, 889.722; 264/258, 314

[56] References Cited
U.S. PATENT DOCUMENTS

| | | | |
|---|---|---|---|
| 3,552,881 | 1/1971 | Rogers et al. | 416/226 |
| 3,967,996 | 7/1976 | Kamov et al. | 416/226 |
| 4,095,322 | 6/1978 | Scarpati et al. | 416/226 |
| 4,188,171 | 2/1980 | Baskin | 416/226 |
| 4,247,255 | 1/1981 | De Rosa | 416/226 |
| 4,298,417 | 11/1981 | Euler et al. | 156/245 |
| 4,650,534 | 3/1987 | Mussi et al. | 156/245 |
| 4,806,077 | 2/1989 | Bost | 416/226 |

*Primary Examiner*—Harold J. Tudor
*Attorney, Agent, or Firm*—Jones, Tullar & Cooper

[57] ABSTRACT

A rotor blade, whose principal structural components are of fiber-reinforced composite material, includes a spar, fairing skins, spar wraps, splices and doublers in the precured condition cut from rolls of raw stock into flat sheets having the dimensions of the components in the assembled position and laid one laminate upon another laminate to the desired thickness dimension. A noseblock and trailing edge block are precompacted and formed to desired shapes and sizes in the precured condition. A honeycomb core, formed to the contour of the trailing portion of an airfoil behind the spar, is prepared. Molding tools, one tool having the contour of the upper blade surface and another tool having the contour of the lower blade surface, each tool adapted for assembly together so that their inner surfaces envelop the outer blade surface, are formed and adapted to receive the components of the blade therein. The components are placed in proper order and position in one molding tool, the other tool is pressed against the first tool, and the unit is sealed. A stiffened flexible bag, located in the tool between upper and lower spar packs, is pressurized. Temperature of the assembly is raised and controlled variably in accordance with a prescribed cycle that polymerizes the composite and bonds the components mutually.

19 Claims, 3 Drawing Sheets

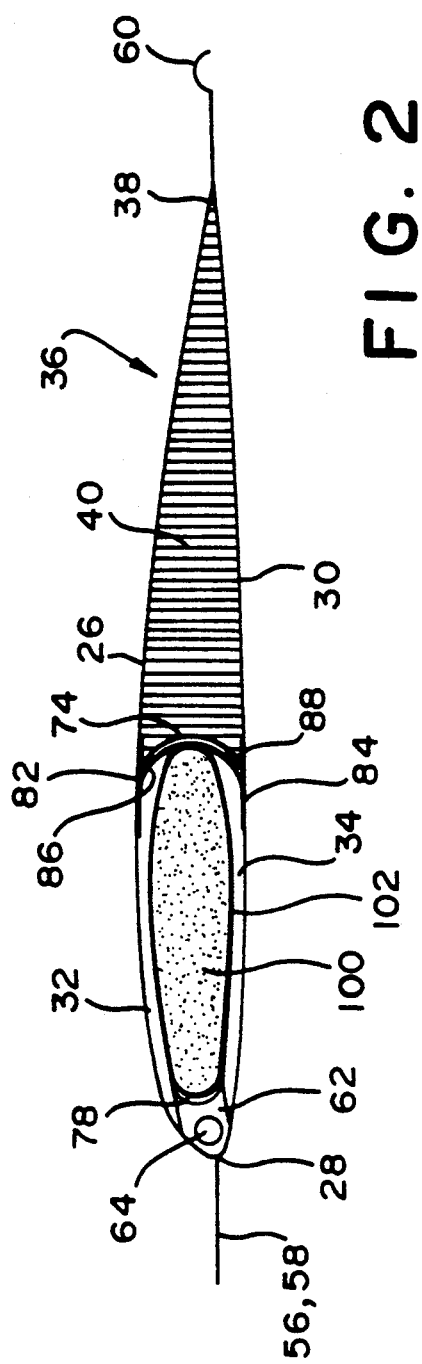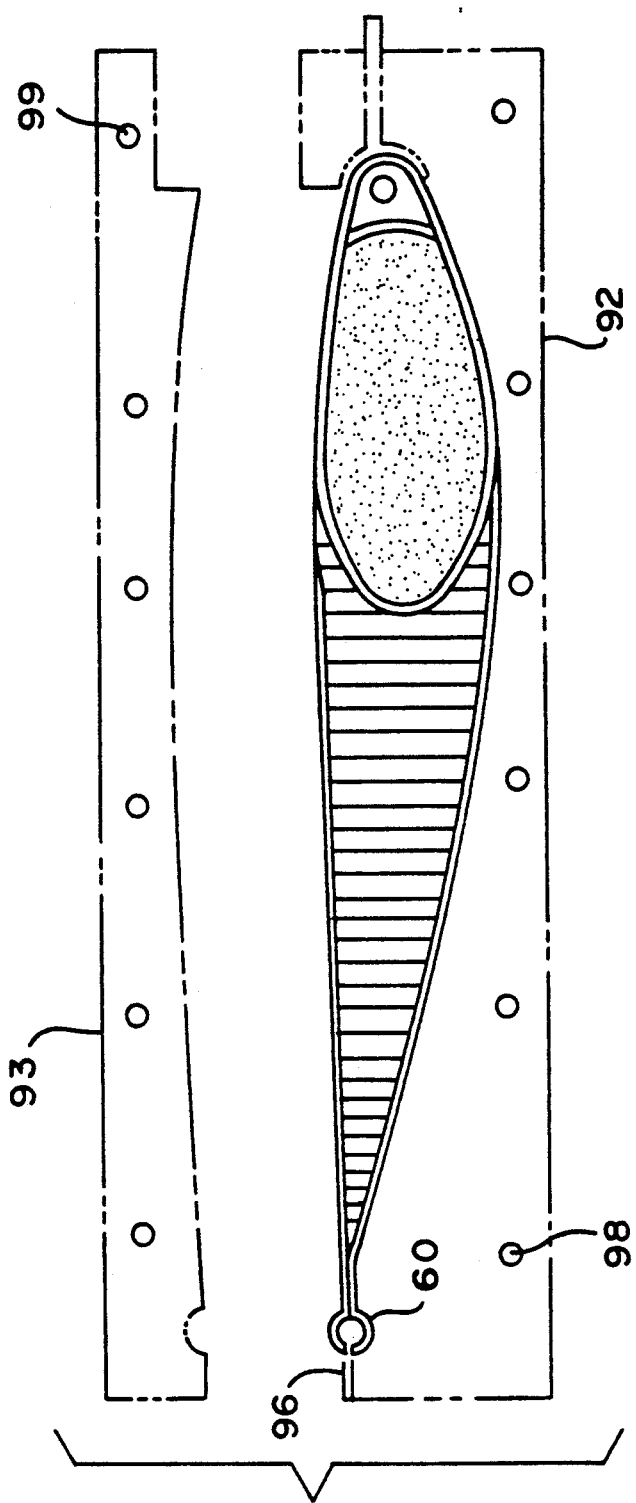

5,248,242

AERODYNAMIC ROTOR BLADE OF COMPOSITE MATERIAL FABRICATED IN ONE CURE CYCLE

BACKGROUND OF THE INVENTION

1. Field of the Invention

This invention relates to the field of products manufactured from fiber-reinforced elastomeric resin, particularly to techniques for fabricating such products, especially rotor blades formed in one cycle at elevated temperature and pressure.

2. Description of the Prior Art

Conventional helicopter rotor blades, fabricated of composite materials having fiber-reinforced elastomeric resin, require multiple cure cycles at elevated temperature and pressure lasting several hours in order to form the shape of the components of the blade assembly. During these cure cycles, the resin of the composite material polymerizes to optimal structural stiffness and strength, provided temperature is controlled and varied over the length of the cycle in accordance with a defined schedule usually set by the manufacturer's specifications. Positive pressure applied to the material helps to force air from the components to ambient atmosphere outside the tool in which the components are formed.

This technique requires carefully sizing many laminae of composite material in a precured condition cut from raw stock to precise dimensions. Each component requires a molding tool, into which precured laminae are placed, sealed by a plastic bag enveloping the tool, and pressurized during the cure cycle. Usually the components are cured in an autoclave or large furnace having a sealed chamber whose pressure is increased in order to induce air to escape the laminae during the cure cycle. This process requires careful control of temperature and pressure to the requirements of the cure cycle. Typically temperature is raised to 250 degrees F and pressure to 85 psi.

U.S. Pat. No. 4,095,322 describes a rotor blade fabricated from composite material of fiber-reinforced resin. The method of fabrication requires several cure cycles at high temperature and pressure to form individual components and a final cure cycle during which the components are held in position and bonded to form an assembly. The structure of the rotor blade and aft fairing, a subassembly of the blade assembly, described in U.S. Pat. No. 4,316,701 are compatible with the fabrication method of the '322 patent.

However, various resins and bonds produced by different manufacturers require different cure cycle conditions to satisfy manufacturer's specifications and to realize optimal structural properties. A fabricator using diverse materials must carefully control operation of the autoclave so that products being cured and/or bonded there are compatible with the temperature cycle being used.

A rotor blade fabricated in the conventional way includes a leading edge shell forming the nose or leading edge of the airfoil and root end areas, and a heel channel forming the rear closure of the spar. Each of these components requires a separate cure and molding tool to produce acceptable dimensional tolerance control and physical properties. After these components are fabricated, they are bonded to other components to form subassemblies, which are subsequently placed in a molding tool or fixture and bonded to other subassemblies while other components are being cured.

For example, the spar heel channel is bonded to the forward face of a formed honeycomb core to produce one subassembly. The spar packs are bonded to the leading edge shell to produce a subassembly comprising the forward portion of the airfoil contour. Thereafter, the spar-leading edge subassembly is bonded to the heel-core subassembly to form the major portion of the blade, exclusive of the trailing edge. A trailing edge block is fabricated separately and then bonded to the rearward edge of the core, or formed and bonded integrally with the core in a single cure cycle.

Time, complexity and cost to produce rotor blades using multiple cure and bonding cycles are prohibitive.

SUMMARY OF THE INVENTION

The principal structural components of a rotor blade according to the present invention are made of fiber-reinforced composite material. These components include a spar, fairing skins, spar wraps, splices and doublers cut as lamina from raw stock into flat sheets in the precured condition. Each lamina of the requisite dimensions is laid upon other such lamina of the component in sufficient number until the desired thickness dimension of the component being fabricated is produced. During the process of laying-up the laminae sequentially, the material and direction of the reinforcing fibers can be varied intentionally among the components and within a particular component so that the finished product has the structural properties associated with the intended fiber direction.

A noseblock and a trailing edge block are precompacted to drive air from the composite and to form the desired shapes and sizes of these members in the precured condition.

A core of honeycomb, formed by passing a rotating drum of abrasive material across the core, is prepared using forming templates having the contour of the trailing portion of an airfoil.

Molding tools, one tool having the contour of the upper blade surface and another tool having the contour of the lower blade surface, each tool adapted for assembly together so that their inner surfaces envelop the outer blade surface, are formed and adapted to receive the components of the blade therein.

The uncured components are placed in the proper order and position in one molding tool, the other tool is placed over the first tool, and the unit is sealed. Preferably the tool having the upper blade contour is placed on a worktable with its inner surface facing upward. The upper fairing skins and the noseblock are placed in the tool. A member, comprising a mandrel of styrofoam extending the length of the blade and supporting a flexible sealed rubber bag, has certain components applied to the outer surface of the bag. The upper spar pack, upper spar wraps, a leading edge splice and heel splice are placed on the bag before it is located within the tool. Then the bag and mandrel, with certain components located on the bag, are placed in the tool. The lower spar packs and lower spar wraps are placed over the lower surface of the bag. The forward edges of the upper and lower spar wraps are draped over the noseblock and the rearward edges of the spar wraps are brought into abutting contact at the heel of the spar.

The formed core, covered with adhesive sheet and a layer of foam adhesive at its forward face, is placed in the tool behind the spar heel. The precompacted trailing edge block is placed behind the core and covered with filler strips that overlap the fairing skins. Suitable strips of foam bond are located over the spar Packs below the skins to fill space otherwise Potentially vacant and to support a local area of the skins above the foam. The lower fairing skins are then placed over the contents of the tool, and the portion of the molding tool having the lower blade contour is placed over the lower skins and pressed downward against stop surfaces to a predetermined position relative to the tool portion that contains the blade components.

The stiffened flexible bag, located in the tool between upper and lower spar packs, is pressurized. Heated oil passing through plates adjacent the tool heats the tool and its contents to the required temperature. The temperature of the assembly is raised and controlled variably in accordance with a cure cycle that polymerizes the composite and bonds the components. After the tool and cured blade cool sufficiently, the fabricated blade is removed from the tool, selvage strips are removed from the leading edge and excess resin clinging to the blade surface is removed.

A rotor blade manufactured by the method of this invention requires substantially fewer tools, includes fewer parts, and is fabricated in less time and at lower cost than with conventional techniques. The components of the assembly are bonded mutually and formed to shape concurrently during one cure cycle; consequently, multiple curing cycles of components and bonding cycles to form subassemblies are eliminated. The product that results is structurally sound, dimensionally accurate, and of high quality.

BRIEF DESCRIPTION OF THE DRAWING

The invention is described in more detail with reference to the embodiments illustrated in the following drawings.

FIG. 2 is a cross section of a rotor blade made from fiber-reinforced composite material by the techniques of this invention.

FIG. 3 is a cross section of a rotor blade located in two molding tool portions, whose inner surfaces have the size and contour of the surface of the rotor blade when the tool portions are positioned as shown during the cure cycle.

DESCRIPTION OF THE PREFERRED EMBODIMENT

Figure 1:
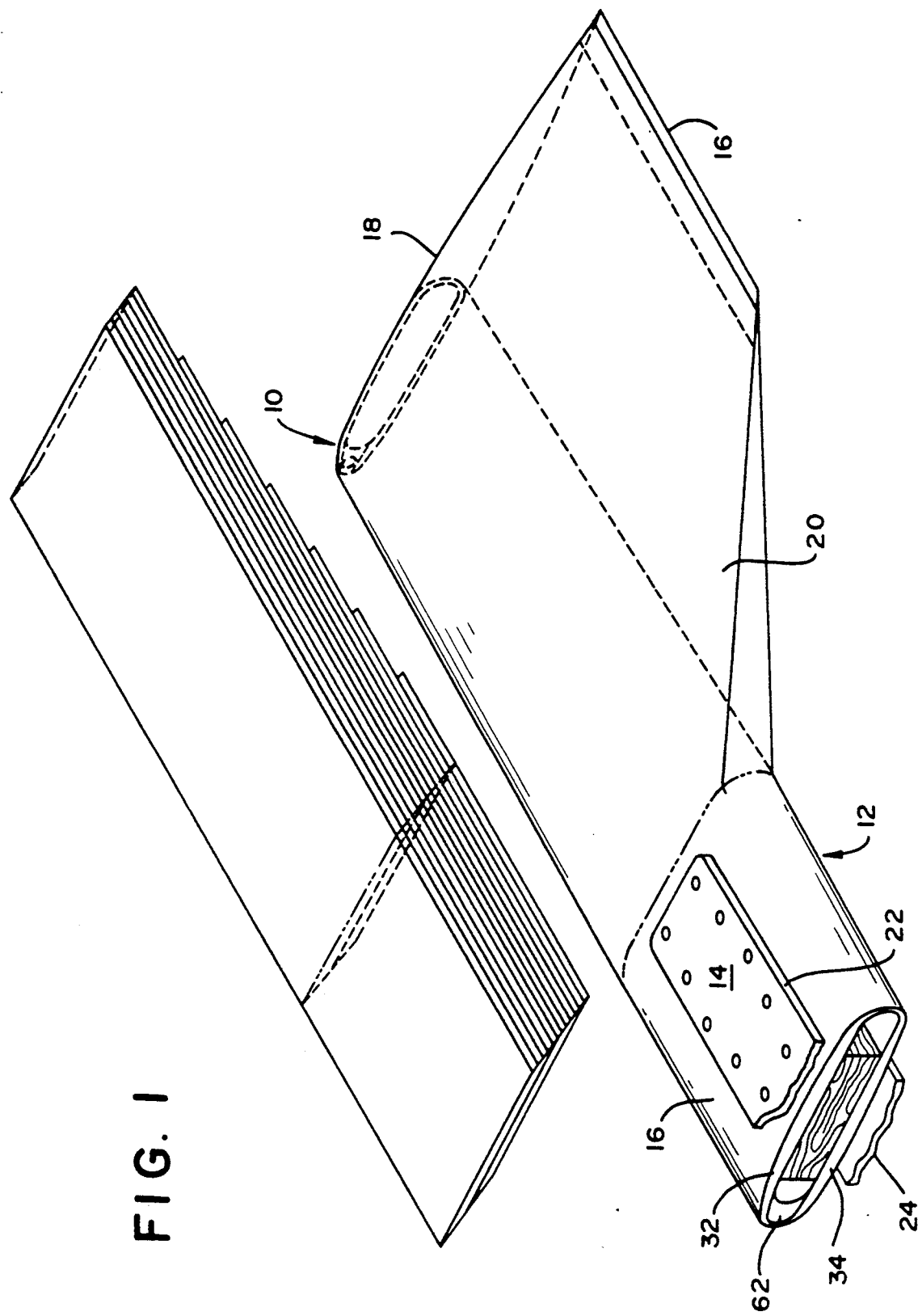
FIG. 1 is an isometric illustration of a rotor blade viewed from above its upper surface from the root toward the tip.
Figure 4:
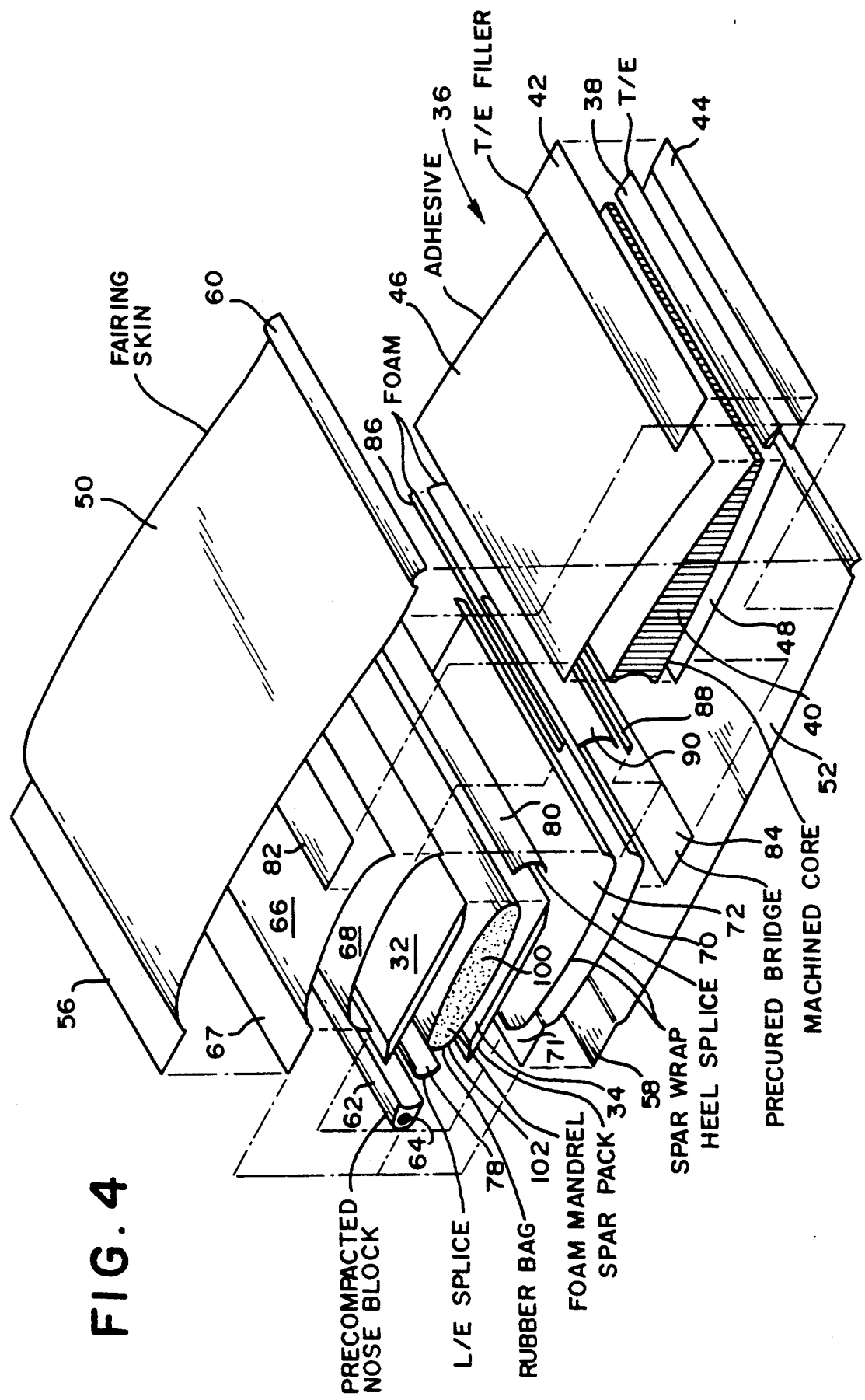
FIG. 4 is an isometric view at a spanwise cross section showing a representative length of the components of a rotor blade according to this invention, each component spaced in elevation and chordwise from adjacent components, a transverse edge of each component located spanwise at the plane where the section is taken.

Referring first to FIG. 1, the rotor blade 10 includes a root end 12 adapted for attachment to supporting structure in the form of a metal fitting 14, an airfoil portion 16 extending to the tip 18, and a transition portion 20 located between the root and airfoil. Fitting 14 has upper and lower arms 22, 24 overlapping outer surfaces of the root, each arm having bolt holes aligned with corresponding holes drilled through the blade after fabrication. A bolted mechanical connection is made at each bolt hole between the root and fitting. The fitting extends radially inward from the end of the blade to a rotor hub connection that prevents translations of the blade relative to the rotor hub but permits flapwise and chordwise flexure and torsional displacement. The hub includes bearings, partially spherical in form and made of alternating shims of elastomer and metal, the bearings defining three mutually perpendicular axes about which the blade is supported to permit the flexural and torsional displacements.

The portion of the blade length that extends from the outer end of the root to the tip is an airfoil designed to produce aerodynamic lift as the ambient airstream passes over the blade surface. FIG. 2 shows that the upper surface is substantially coutoured and cambered, the leading edge 28 is drooped in relation to the mean chord line, and the lower surface 30 is contoured but flat relative to the upper surface. The span of the blade is large relative to its other dimensions: the width or chord may be 20–36 inches, the span or length may be 300–360 inches, and the airfoil thickness or depth may be 1.5–3.5 inches.

The main structural member is a spar comprising an upper spar pack 32 and a lower spar pack 34, each pack extending spanwise from root to tip and chordwise from the vicinity of the leading edge to approximately one-third of the blade width. The reinforcing fibers of the spar, principally fiber glass and a smaller volume of graphite, are substantially unidirectional and directed along the span. The thickness of the spar packs increases along the span from tip to root and tapers chordwise at the forward and rearward edges.

The airfoil portion 16 includes a fairing 36 extending spanwise from the radially inner end of the transition portion to the tip, and chordwise from the spar heel to a trailing edge block 38. Aerodynamic lift, developed across the chord of the airfoil, is carried as a shear load by a fairing core 40 made of Nomex honeycomb, the cells of which are hexagagonal in cross section having an axis directed substantially perpendicular to the mean chord line, located midway between the upper and lower contours of the fairing. This honeycomb core, manufactured commercially by Hexcell Corporation, is of thin-walled plastic supplied in the form of a compact monolithic rectangular block, in which the cells are not formed, but instead are folded into thin sheets stacked on edge side-by-side. The core is expanded by application of tension force directed spanwise and chordwise until the cells are hexagonal and dimensionally accurate. The core is expanded first to the correct cell size and shape so that it extends spanwise the distance from root to tip and chordwise the distance from the spar heel to the trailing edge. Then the contour of the core is formed by abrasion material, such as sandpaper, rotating on a drum moving across the honeycomb core guided by contour templates. Alternatively, while in block form, the contour of the fairing is formed to shape and size and then the core is expanded. With either forming technique, the depth of the core contour is formed slightly smaller than the depth of fairing, so that the thicknesses of the fairing skins and adhesive sheet between the skins and core is accommodated in the molding tools. When the tools are closed, some pressure between the tool and fairing skins helps to perfect the cure of the fairing skins and assures adequate wetting of the core by the adhesive to bond the skins to the core.

In cross section, trailing edge block 38 is a wedge located behind the core extending from the transition portion to the tip. The reinforcing fibers of the trailing edge block are directed spanwise and may include fibers having a higher modulus of elasticity, such as graphite or boron, than other reinforcing fibers of the blade so that blade chordwise bending stiffness is sufficiently large to satisfy the dynamic requirements of the rotor system.

Structural continuity across the butt joint between the trailing edge block 38 and honeycomb core 40 is enhanced by upper and lower trailing edge filler strips 42, 44, which extend chordwise from a front edge that overlaps the core to a back edge that overlaps the fairing skins. The reinforcing fibers of strips 42, 44 are generally cross plies of laminates directed at positive and negative angles of 45 degrees with respect to the longitudinal axis of the blade, the proportion being nearly equally divided between the two angular directions. Alternatively, one-half of the fibers are directed parallel to the longitudinal axis of the blade and one-half are directed transversely thereto.

A sheet of unpolymerized epoxy adhesive 46, 48 is located between the upper and lower surfaces of the fairing core and the upper fairing skin 50 and lower fairing skin 52, respectively.

When the components are assembled in the molding tool and heated, the adhesive and epoxy resin in the laminates of fiber-reinforced material polymerize and mutually bond. Polymerization is evidenced physically by the stiffening and strengthening of adhesive and resin, creation of a high strength bond among contiguous components, wetting and mutual bonding of the fibers by the resin in which they are carried, and disappearance of the tacky adherence characteristic of adhesive and resin. When the materials from which the components are formed are shipped by the manufacturer to the fabricator and before the components are cured in the molding tool, the resin in the laminates of the fiber reinforced composite material and the adhesive are partially polymerized (the uncured condition). In this condition, they are tacky and adhere readily to other laminates of the assembly. This attribute assures dimensional stability and location of lamina during the process of forming the various components to a desired thickness and laying each component on another component inside the molding tool.

The upper and lower fairing skins 50, 52 comprise multiple laminates of woven fiber glass, whose reinforcing fibers alternately are directed parallel and perpendicular to the longitudinal axis of the blade, the proportion being substantially equally divided between the two angular directions. Alternatively, one-half of the fibers are directed parallel to the longitudinal axis of the blade and one-half are directed transversely thereto, or at positive and negative 45 degree angles with respect to this axis. The fairing skins extend spanwise from root to tip and chordwise beyond the leading edge 28 from the forward edge of selvage strips 56, 58 to the edge of a semicircular hook 60 located behind trailing edge block 38.

A noseblock 62 having the contour of the airfoil near the leading edge is located ahead of the spar and extends spanwise from root to tip. The noseblock is precompacted before insertion in the molding tool to accomodate metal cylindrical leading edge rods 64 that extend in combination from the inboard end of the airfoil portion 16 to the vicinity of the blade tip 18. The noseblock is fabricated of multiple layers of fiber-reinforced resin composite material. As this material is inserted in a tool where it is formed to shape, ambient air is forced periodically from the material by applying pressure directed toward the material along the entire length of the noseblock. This process is called precompaction.

Located below the upper fairing skin 50 and above upper spar pack 32 are first and second spar wraps 66, 68. Located between the lower fairing skin 52 and lower spar pack 34 are third and fourth spar wraps 70, 72. Spar wraps 66, 70, which include doublers 67, 71 overlapping the selvage strips, are in mutual contact along the blade length and across the width of the selvage strips 56, 58 after the cure, but they are removed at the leading edge radius following removal of the blade from the molding tool after curing. Spar wraps 66, 70 extend chordwise over noseblock 62 from the front edge of selvage strips 56, 58 rearward around the spar heel to a butt joint 74 located at the mid-depth of the airfoil thickness, where all rearward edges of the spar wraps abut mutually. Spar wraps 68, 72 extend chordwise from a butt joint located ahead of the noseblock at the leading edge radius, where all forward edges of the spar wraps 68, 72 abut mutually, around the spar heel to butt joint 74 located at the mid-depth of the airfoil thickness, where all the rearward edges of the spar wraps abut mutually. The spar wraps extend spanwise from root to tip.

Spar wraps 66, 68, 70, 72 comprise multiple laminae, whose reinforcing fibers are partially of HM graphite alternately directed at positive and negative 45 degree angles with respect to the longitudinal axis of the blade, and partially of woven fiber glass directed parallel and perpendicular to the longitudinal axis, the proportion of each material being substantially equally divided between the angular directions.

Structural continuity across the spar packs and the noseblock is provided by leading edge splice 78, which overlaps and contacts spar wraps 68, 72. Structural continuity across butt joint 74 is provided by heel splice 80, which overlaps and contacts spar wraps 68, 72 and the spar pack thickness that is tapered at the rearward extremity of the spar. Splices 78, 80 comprise multiple laminates whose reinforcing fibers alternately are directed at positive and negative 45 degree angles with respect to the longitudinal axis of the blade, the proportion being substantially equally divided between the two angular directions.

The forward tapered thickness of the spar packs accomodates the cambered airfoil contour and allows the spar to overlap the noseblock. The rearward tapered spar thickness is inclined away from the airfoil contour. Therefore, potential exists for lack of support of the fairing skins below the contour forward of the core in the vicinity of the rear spar tapered thickness. Accordingly, upper and lower bridge splices 82, 84 are located below the fairing skins and over the outer surface of the rear tapered thicknesses of the upper and lower spar packs to provide support for the skins. Bridge splices 82, 84 include multiple laminates whose reinforcing fibers alternately are directed at positive and negative 45 degree angles with respect to the longitudinal axis of the blade, the proportion being substantially equally divided between the two angular directions. Alternatively, one-half of the fibers are directed parallel to the longitudinal axis of the blade and one-half are directed transversely thereto.

Additional support for the fairing skins and a structural bond of the bridge splices to the outer surfaces of the spar packs in this region is provided by upper and lower foam strips 86, 88 (known as "AF 3024 foam bond"). The foam is applied in the form of an uncured strip that expands with application of heat during the cure cycle to fill the space between the fairing skins and corresponding spar pack. An arcuate sheet of uncured AF 3024 foam bond 90, located between the front arcuate face of the core 40 and the rear side of heel splice 80 at butt joint 74, is also applied to the uncured assembly of components. When heat is applied to the tool and its contents, member 90 expands, fills the adjacent cells of the core, and bonds the core to heel splice 80. Alternately, the arcuate foam member 90 may be formed from expanded cured foam, which is bonded during the cure cycle to the core radius, spar heel and adjacent spar wraps 66, 70 by bond material applied to its surfaces in sheet form.

FIG. 3 shows the blade assembly located in a molding tool 92, whose inner surface has the shape of the upper surface of the blade including the airfoil, transition, and root end portions. A complementary molding tool portion 93 having the shape of the lower blade surface is pressed toward tool portion 92 against stop surfaces to establish a predetermined distance of tool 93 relative to tool 92. Tool portions 92, 93 include leading edge flanges on which selvage strips 56, 58 and doublers 67, 71 are held and retained by the pressing contact between the tools against displacement during the cure cycle.

The upper and lower tools are formed in longitudinal sections, joined mutually at bolted flange connections 98, 99. The tool and its contents are heated by high temperature oil flowing through plates adjacent the outer surfaces of the tool.

Pressure is developed within the tool to force the uncured components outward against the tool surface and to force air entrapped in the lamina out of the tool. This action is accomplished by forming a relatively rigid mandrel 100 of solid structural styrofoam having an outer surface slightly smaller than the inner contour of the spar packs 32, 34 and spar wraps 68, 72.

A bag 102 of flexible rubber approximately 0.10 inches thick and sealed against air is placed over the mandrel and extends the full blade length. The mandrel supports the bag, and both are designed for removal from the blade after it is cured. The bag and mandrel are taken from the tool by applying axial force in the direction of the root end. To avoid tearing the bag due to unintentionally bonding the inner surface of the blade to the outer surface of the bag during the cure cycle, a parting agent, such as peel ply, is applied to the bag to prevent creation of such bonds and to facilitate removal against the effect of friction.

The lower tool 92 containing the upper airfoil contour is placed on a worktable with the inner surface of the tool facing upward. One layer of peel ply is placed over the surface to facilitate removal of the cured blade from the tools. The composite material in the precured condition will have been cut from rolls of raw stock into flat laminae having the dimensions of the components in the assembled position and laid one lamina upon another lamina until the thickness dimension is reached.

The upper fairing skin 50 is then placed on the tool surface with the selvage strip 56 resting on flange 94 and trailing edge hook 60 located in a spanwise recess 104 having the appropriate size and shape. Care is taken throughout the fabrication process to eliminate air from the assembly, especially in the form of air bubbles sealed by the resin between laminates.

Precured bridge 82 is located in the tool on the inner surface of the upper fairing skin at its correct chordal position. Then spar wrap 66 is placed in the tool over the upper fairing skin 50 and bridge 82.

Next, the rubber bag 102 and styrofoam mandrel 100 are assembled and located outside the tool. Upper spar pack 32, leading edge splice 78 and heel splice 80 are located on the bag at their correct positions. Upper foam strip 86 is placed on the upper spar pack near the heel, and upper spar wrap 68 is placed on the bag 102 over the spar pack so that the rearward edges abut mutually at the trailing edge of the bag over heel splice 80.

Then noseblock 62, with its tungsten leading edge rods 64 installed, is placed in tool 92 after the noseblock is precompacted.

The bag, supported by the mandrel with spar wrap 68, spar pack 32, foam strip 86, and splices 78, 80 applied, is placed carefully as a unit into the tool. Next, the lower spar pack 34, foam strip 88, inner spar wrap 72 and outer spar wrap 70 of the lower contour are placed in their respective positions in the tool. The front edges of spar wraps 68, 72 are placed over the noseblock so that they abut mutually at the leading edge radius. The rear edges of spar wraps 68, 72 are placed over heel splice 80 so that they abut mutually at the mid-depth or mid-thickness of the blade.

Honeycomb core 40, with its surfaces covered by adhesive bonding sheets 46, 48 and arcuate foam adhesive strip 90, are placed in the tool with the arcuate front face of the core adjacent heel splice 80. A strip of foam adhesive is placed on the rear edge of the core.

The precompacted trailing edge block 38 is placed behind the core, and fillers 42, 44 are located so that they overlap the core and core adhesive.

Precured bridge 84 is located in position on the lower fairing skin 52 and the skin is placed in the tool and located such that hook 60 is located in tool recess 104 and selvage strip 58 overlaps strip 56.

A layer of peel ply is applied to the inner surface of each tool portion, and each spanwise section of the lower tool is placed over the layup with the inner surface facing downward. End plates and pressure manifolds are attached to the tool to seal it against passage of air. The tool is loaded by a hydraulic press, the tool flanges grip the selvage strips and doublers, and the lower tool portion is forced by the press to a predetermined distance relative to the upper tool portion. Positive pressure of 70-85 psi is applied to the bag and the temperature of the unit is raised to approximately 250 degrees F. These conditions are maintained for about 120 minutes, whereafter the heat source is removed so that the spar wall temperature drops to 100 degrees. Then bag pressure is exhausted, the contents of the tool are cooled to room temperature, and the cured blade is removed. Strips 56, 58 are cut away from the leading edge, peel ply is stripped from the outer surface, and excessive resin clinging to the surface is removed.

We claim:

1. A method of fabricating a rotor blade from fiber reinforced resin composite material in a molding tool having complementary portions, a first tool portion and a second tool having complementary portions, a first tool portion and a second tool portion, the inner surface of said tool portions in assembled combination having the shape of the outer surface of the rotor blade, comprising the steps of:

fabricating from uncured composite material first blade components to be located on a first side of a plane located substantially midway between the upper and lower surfaces of the blade and second blade components to be located on a second side of said plane, said first and second blade components including first and second spar packs, respectively;

forming a fairing core having the shape of a portion of an airfoil located behind the spar packs;

forming a precompacted noseblock of uncured composite material;

forming a precompacted trailing edge block of uncured composite material;

placing in the first tool portion the noseblock, and first blade components;

placing a stiffened, pneumatically sealed flexible bag adapted to be pressurized in the first tool portion over the first spar pack of the first blade components;

placing in the first tool portion the fairing core, trailing edge block and second blade components, the second spar pack of the second blade components being placed over the bag;

closing the tool by forcing the second tool portion toward a predetermined position relative to the first tool portion, and sealing the ends of the tool;

pressurizing the bag; and heating the tool and its contents in accordance with a temperature cure cycle that polymerizes the resin of the composite material and bonds the members of the blade mutually.

2. The method of fabricating a rotor blade as defined in claim 1, further comprising the steps of:

extending a portion of the first and second blade components outside the inner surface of said tool portions; and holding that portion of the first and second blade components that extend outside the inner surface of said tool portions between said first and second tool portions against displacement during the cure cycle.

3. The method of fabricating a rotor blade as defined in claim 1, further comprising the steps of:

cooling the tool and its contents;

exhausting the bag;

opening the tool;

removing the blade from the tool;

removing the bag from the blade; and removing selvage strips of composite material and excess resin from the surface of the blade.

4. The method of fabricating a rotor blade as defined in claim 1, wherein forming the fairing core includes:

passing a rotating drum covered with abrasive material, guided by forming templates having the contour of the trailing edge portion of an airfoil across the core; and forming on the outer surface of the core a portion of an airfoil contour that is located behind the spar packs by removing material by abrasion from the unformed surface of the core.

5. A method of fabricating a rotor blade from fiber reinforced resin composite material in a molding tool having complementary portions, the inner surface of said tool in assembled combination having the shape of the outer surface of the rotor blade, an upper tool portion corresponding to the upper surface of the rotor blade, a lower tool portion corresponding to the lower surface of the rotor blade, comprising the steps of:

fabricating from uncured composite material upper blade components to be located above a plane located substantially midway between the upper and lower surfaces of the blade and lower blade components to be located below said plane, said upper and lower blade components including upper and lower spar packs, respectively;

forming from structural honeycomb a fairing core having the shape of a portion of an airfoil located behind the spar packs;

forming a precompacted noseblock and a precompacted trailing edge block of uncured composite material;

disposing the upper tool portion with its inner surface facing upward;

placing in the upper tool portion the noseblock, and upper blade components;

placing a stiffened, pneumatically sealed flexible bag adapted to be pressurized in the upper tool portion over the upper spar pack of the upper blade components;

placing in the upper tool portion the fairing core, trailing edge block and lower blade components, the lower spar pack of the lower blade components being placed over the bag;

closing the tool by forcing the lower tool portion against the contents of the upper tool portion to a predetermined position relative to the upper tool portion and sealing the ends of the tool;

pressurizing the bag; and heating the tool and its contents in accordance with a temperature cure cycle that polymerizes the resin of the composite material and bonds the members of the blade mutually.

6. The method of fabricating a rotor blade as defined in claim 5, wherein fabricating the upper blade components includes:

forming laminae from uncured composite material sheet or tape into flat sheets having the dimensions of the upper spar pack, an upper fairing skin, upper spar wraps, a leading edge splice, a spar heel splice and an upper trailing edge filler; and laying each lamina of the requisite dimensions of the upper spar pack, upper fairing skin, upper spar wraps, leading edge splice, spar heel splice and upper trailing edge filler upon other laminae of the components respectively in sufficient number until the desired thickness dimension of the respective components is produced.

7. The method of fabricating a rotor blade as defined in claim 5, wherein fabricating the lower blade components includes:

forming laminae from uncured composite material sheet or tape into flat sheets having the dimensions of the lower spar pack, a lower fairing skin, lower spar wraps, and a lower trailing edge filler; and laying each lamina of the requisite dimensions of the lower spar pack, lower fairing skin, lower spar wraps, and lower trailing edge filler upon other such laminae of the respective components in sufficient number until the desired thickness dimension of the respective components is produced.

8. The method of fabricating a rotor blade as defined in claim 6, wherein fabricating the upper fairing skin includes:

forming an upper bridge from a flat sheet of uncured composite material having a spanwise dimension extending the length of the airfoil and a chordwise dimension extending from a position overlapping the upper spar pack at the upper airfoil contour to a point overlapping the core;

curing said upper bridge at elevated temperature for sufficient time to polymerize its uncured resin; and placing the cured upper bridge against the inner surface of the upper fairing skin.

9. The method of fabricating a rotor blade as defined in claim 6, wherein fabricating the lower fairing skin includes:

forming a lower bridge from a flat sheet of uncured composite material having a spanwise dimension extending the length of the airfoil and a chordwise dimension extending from a position overlapping the lower spar pack at the lower airfoil contour to a point overlapping the core;

curing said lower bridge at elevated temperature for sufficient time to polymerize its uncured resin; and placing the cured lower bridge against the inner surface of the lower fairing skin.

10. The method of fabricating a rotor blade as defined in claim 5, wherein the steps of fabricating the upper blade components and placing the upper blade components in the upper tool portion includes:

forming laminae from uncured composite material sheet or tape into flat sheets having the dimensions of the upper spar pack, an upper fairing skin, upper spar wraps, a leading edge splice, a spar heel splice and an upper trailing edge filler;

laying each lamina of the requisite dimensions of the upper spar pack, upper fairing skin, upper spar wraps, leading edge splice, spar heel splice and upper trailing edge filler upon other laminae of the components respectively in sufficient number until the desired thickness dimension of the respective components is produced; and placing the upper spar pack, upper fairing skin, upper spar wraps, leading edge splice, spar heel splice and upper trailing edge filler in the upper tool portion.

11. The method of fabricating a rotor blade as defined in claim 5, wherein the steps of fabricating the lower blade components and placing the lower blade components in the upper tool portion includes:

forming laminae from uncured composite material sheet or tape into flat sheets having the dimensions of the lower spar pack, a lower fairing skin, lower spar wraps, and a lower trailing edge filler; and laying each lamina of the requisite dimensions of the lower spar pack, lower fairing skin, lower spar wraps, and lower trailing edge filler upon other such laminae of the respective components in sufficient number until the desired thickness dimension of the respective components is produced; and placing the lower spar pack, lower fairing skin, lower spar wraps, and lower trailing edge filler in the upper tool portion.

12. The method of fabricating a rotor blade as defined in claim 5, wherein the step of placing the fairing core in the upper tool portion comprises:

passing a rotating drum covered with abrasive material, guided by forming templates having the contour of the trailing edge portion of an airfoil across the core;

forming on the outer surface of the core a portion of an airfoil contour that is located behind the spar packs by removing material by abrasion from the unformed surface of the core;

covering the upper and lower surfaces of the core with adhesive sheet;

locating uncured expandable foam adhesive on the spanwise length of the front face of the core; and placing the core, adhesive sheet, and foam adhesive in the upper tool portion behind the upper spar pack.

13. The method of fabricating a rotor blade as defined in claim 5, wherein the steps of placing the upper and lower fairing skins in the upper tool portion comprises:

forming an upper bridge from a flat sheet of uncured composite material having a spanwise dimension extending the length of the airfoil and a chordwise dimension extending from a position overlapping the upper spar pack at the upper airfoil contour to a point overlapping the core;

curing said upper bridge at elevated temperature for sufficient time to polymerize its uncured resin;

placing the cured upper bridge against the inner surface of the upper fairing;

forming a lower bridge from a flat sheet of uncured composite material having a spanwise dimension extending the length of the airfoil and a chordwise dimension extending from a position overlapping the lower spar pack at the lower airfoil contour to a point overlapping the core;

curing said lower bridge at elevated temperature for sufficient time to polymerize its uncured resin;

placing the cured lower bridge against the inner surface of the lower fairing skin;

placing the upper fairing skin and upper bridge in the upper tool portion such that the upper bridge is facing upward; and placing the lower fairing skin and lower bridge in the upper tool portion such that the lower bridge is facing downward.

14. The method of fabricating a rotor blade as defined in claim 5, further comprising the steps of:

cooling the tool and its contents;

exhausting the bag;

opening the tool;

removing the blade from the tool;

removing the bag from the blade; and removing selvage strips of composite material and excess resin from the surface of the blade.

15. The method of fabricating a rotor blade as defined in claim 5, further comprising the steps of: components outside the inner surfaces of the upper and lower tool portions; and holding that portion of the upper and lower blade components that extend outside the inner surfaces of said tool portions between said tool portions against displacement during the cure cycle.

16. An aerodynamic rotor blade assembly fabricated of fiber-reinforced resin composite material, having outer surfaces in the form of an airfoil having a leading edge, a trailing edge, radial length and depth, comprising:

a spar member extending chordwise along the upper and lower surfaces of the airfoil from a noseblock engaging portion to a trailing edge portion, including a first spar pack located on a first side of a plane located substantially midway between the upper and lower surfaces of the airfoil and a second spar pack located on a second side of said plane;

a noseblock located at the leading edge surface of the airfoil, a portion of said spar packs overlapping the noseblock;

an upper spar wrap member covering the upper surface of the noseblock and the upper spar pack, extending from the airfoil leading edge to a first edge located at the midplane;

a lower spar wrap member covering the lower surface of the noseblock and the lower spar pack, extending from the airfoil leading edge to a second edge located at the midplane;

a fairing core having the shape of a portion of an airfoil located behind the spar packs, extending the depth of the airfoil contour;

a trailing edge block located behind the fairing core, extending radially the length of the airfoil, chordwise from the fairing core to the trailing edge of the airfoil, and the depth of the airfoil;

an upper fairing skin extending radially the length of the airfoil and chordwise from the leading edge to the trailing edge, covering the outer surface of the upper spar wrap, the upper surface of the fairing core and the trailing edge block; and a lower fairing skin extending radially the length of the rotor blade and chordwise from the leading edge to the trailing edge, covering the outer surface of the lower spar wrap, the lower surface of the fairing core and the trailing edge block.

17. The rotor blade of claim 16, further comprising a heel splice overlapping the first edge of the upper spar wrap and the second edge of the lower spar wrap.

18. The rotor blade of claim 16, further comprising:

an upper bridge of thin precured composite material sheet extending radially the length of the airfoil and chordwise overlapping the trailing edge portion of the upper spar pack and overlapping the upper surface of the fairing core; and a lower bridge of thin precured composite material sheet extending radially the length of the airfoil and chordwise overlapping the trailing edge portion of the lower spar pack and overlapping the upper surface of the fairing core.

19. The rotor blade of claim 16, further comprising:

a heel splice overlapping the first edge of the upper spar wrap and the second edge of the lower spar wrap;

an upper bridge of thin precured composite material sheet extending radially the length of the airfoil and chordwise overlapping the trailing edge portion of the upper spar pack and overlapping the upper surface of the fairing core; and a lower bridge of thin precured composite material sheet extending radially the length of the airfoil and chordwise overlapping the trailing edge portion of the lower spar pack and overlapping the upper surface of the fairing core.

* * * * *